United States Patent [19]

Sutman et al.

[11] Patent Number: 5,800,719

[45] Date of Patent: Sep. 1, 1998

[54] METHOD FOR DEWATERING DRINKING SLUDGE USING A WATER SOLUBLE BLOCK COPOLYMER

[75] Inventors: Frank J. Sutman, Jacksonville; Richard A. Hobirk, Fernandina Beach, both of Fla.

[73] Assignee: BetzDearborn Inc., Trevose, Pa.

[21] Appl. No.: 856,218

[22] Filed: May 14, 1997

[51] Int. Cl.$^6$ .................................................. C02F 1/54
[52] U.S. Cl. ..................... 210/734; 210/728; 210/781; 210/783; 162/5
[58] Field of Search ........................... 210/725, 727, 210/728, 734, 781, 783, 800; 162/5

[56] References Cited

U.S. PATENT DOCUMENTS

| Re. 28,474 | 7/1975 | Anderson et al. | 260/29.6 H |
|---|---|---|---|
| Re. 28,576 | 10/1975 | Anderson et al. | 260/29.6 H |
| 3,284,393 | 11/1966 | Vanderhoff et al. | 260/29.6 |
| 5,182,331 | 1/1993 | Liao et al. | 525/294 |
| 5,234,604 | 8/1993 | Liao et al. | 210/734 |
| 5,286,390 | 2/1994 | Gray et al. | 210/734 |
| 5,368,744 | 11/1994 | Wood et al. | 210/734 |
| 5,380,444 | 1/1995 | Ryan et al. | 210/734 |
| 5,385,676 | 1/1995 | Liao et al. | 210/734 |
| 5,387,318 | 2/1995 | Liao et al. | 162/5 |
| 5,681,480 | 10/1997 | Langley et al. | 210/734 |

*Primary Examiner*—Jay H. Woo
*Assistant Examiner*—Betsey J. Morrison
*Attorney, Agent, or Firm*—Alexander D. Ricci; Philip H. Von Neida

[57] ABSTRACT

A method for dewatering deinking sludge utilizing a water soluble block copolymer having the structure:

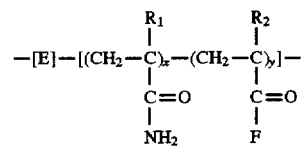

wherein E is a polymeric segment obtained from the polymerization of hydrophobic monomers, x when present is a nonionic monomer, y is a cationic monomer, $R_1$ and $R_2$ are the same or different and are H or a lower alkyl group from $C_1$ to $C_3$ and F is a salt of an ammonium cation. Preferably, the polymer contains from about 20 mole % to 35 mole % cationicity.

9 Claims, No Drawings

METHOD FOR DEWATERING DRINKING SLUDGE USING A WATER SOLUBLE BLOCK COPOLYMER

FIELD OF THE INVENTION

The present invention pertains to methods for dewatering deinking sludge. More particularly, the present invention relates to methods for dewatering deinking sludge with a water soluble block copolymer containing water soluble and water insoluble monomers.

BACKGROUND OF THE INVENTION

The use of recycled fibers is becoming an important aspect of papermaking for economic and environmental considerations. The preliminary manufacturing steps in the use of recycled fibers for papermaking consists of repulping the paper sources, then removing the printing inks from the fibers. A typical deinking process utilizes a combination of chemical and mechanical techniques in several stages. Large amounts of water are used in the washing or flotation stages, wherein chemically treated ink particles and other contaminants are physically removed from the fibrous slurry. The wastewater, or effluent, from these stages is typically recycled back into the mill for reuse in the deinking process. As the recycled effluent contains dispersed inks, fiber fines and inorganic fillers, these contaminants must be removed to provide a clean water source for the deinking process and to prevent the dispersed inks from being reintroduced into the fibers. The effluent may also be discharged from the mill; thus, suspended solids must be removed from the wastewater, or sludge, to meet environmental regulations. These suspended solids and contaminants must be thickened or dewatered in order to aid in their ultimate disposal.

Sludge is given dewatering treatment before being discharged from any given process system. Primary dewatering is usually accomplished using rotary screen thickeners or gravity dewatering tables. Secondary dewatering, including belt presses, screw presses, centrifugation, etc., is then employed to further increase the solids content and reduce the water content in the resulting sludge by up to 95%. This can cause sludge dewatering to be a slow process.

High molecular weight cationic polymers are commonly used for dewatering of wastewater treatment sludge. These types of polymer have recently been successfully applied to the dewatering of deink plant sludge. Deink plant sludge has distinctly different dewatering characteristics than wastewater treatment sludge which is commonly mixed from both primary and secondary wastewater treatment sources. The deink sludge is generally higher in inorganic and cellulose fiber content and can also be pressed to a higher ultimate solids level.

U.S. Pat. No. 5,298,566 teaches a water soluble graft polymer useful for sludge dewatering and water clarification. The graft copolymers are obtained from the polymerization of acrylamide and cationic monomers. '566 does not teach a preferred cationicity for said raft polymers. U.S. Pat. No. 5,387,318 teaches this use of this graft copolymer for laser print deinking loop water clarification. U.S. Pat. No. 5,385,676 teaches using this graft copolymer for paint spray booth sludge dewatering.

U.S. Pat. Nos. 5,182,331 and 5,234,604 teach compositions and methods utilizing the inventive block copolymers for water treatment, particularly sludge dewatering, clarification and wastewater. The '331 and '604 patents do not teach preferred degrees of cationicity or the preferred use of block copolymers over graft copolymers for certain applications. U.S. Pat. No. 5,368,744 teaches the use of the inventive block copolymer for flocculation and clarification of oily wastewater.

Applicants have surprisingly discovered that the block copolymer as taught in the '331 patent is preferred over graft copolymers for the dewatering of office wastepaper deinking sludge. It has been discovered that block copolymers having 20 to 35 mole % cationicity are particularly effective at dewatering wastepaper deinking sludge.

DETAILED DESCRIPTION OF THE INVENTION

The present invention relates to methods for dewatering deinking sludge comprising adding to the deinking sludge an effective dewatering amount of a water soluble block copolymer obtained from the polymerization of hydrophobic or water insoluble monomers attached to a polymer chain obtained from polymerization of one or more water soluble monomers.

The block copolymers of the invention useful for deink sludge dewatering contain a polymeric segment obtained from polymerization of hydrophobic or water insoluble monomers attached to a polymer chain obtained from polymerization of one or more water soluble monomers. The resulting block copolymers are water soluble.

The block copolymer of the invention has the general structure:

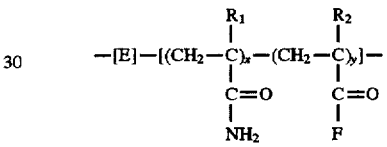

wherein E is a polymeric segment obtained from the polymerization of hydrophobic or water insoluble monomers. Examples of such monomers include alkyl acrylamides, alkyl methacrylamides, alkyl acrylates, alkyl methacrylates, and alkylstyrenes. Preferably, the hydrophobic monomer is an alkyl acrylate having 4 to about 16 carbon atoms in the alkyl group such as 2-ethylhexyl acrylate. Other suitable hydrophobic or water insoluble monomers include the higher alkyl esters of ethylenically unsaturated carboxylic acids such as alkyl dodecyl acrylate, dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N, N-dioctyl acrylamide and similar derivatives thereof; vinyl alkylates wherein alkyl has at least 8 carbons such as vinyl laurate and vinyl stearate, vinyl alkyl ethers such as dodecyl vinyl ether and hexadecyl vinyl ether N-vinyl amides such as N-vinyl lauramide and N-vinyl stearamide; and aralkylstyrenes such as t-butyl styrene. Of the foregoing hydrophobic monomers, the alkyl esters of acrylic acid and methacrylic acid wherein alkyl has from 4 to 16 carbons atoms, are preferred. The hydrophobic polymers are not water soluble and can be prepared by precipitation or emulsion polymerization techniques.

Monomer $x_1$ when present, in the Formula I is a nonionic monomer such as acrylamide or alkylacrylamide. $R_1$ and $R_2$ is H or a lower alkyl group having $C_1$ to $C_3$. Monomer y is a cationic monomer. F in the above formula is a salt of an ammonium cation, such as $NHR_3N+(R_{4,5,6})M^-$ or $OR_3N^+$ $(R_{4,5,6})^-$, wherein $R_3$ is a $C_1$ to $C_3$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and $M^-$ is an anion, such as chloride, bromide, or methyl or hydrogen sulfate. Typical cationic monomers are 2-acryloxyethyltrimethyl ammonium chloride (AETAC), 3-methacrylamidopropyltrimethyl ammonium chloride (MAPTAC), 2-methacryloxyethyltrimethyl ammonium chloride (METAC) and diallyl dimethyl ammonium chloride (DADMAC), etc.

The molar percentage x:y of nonionic monomer: cationic monomer, may fall within the range of between 0:100 to 95:5. The molar percentages of x and y must add up to 100%. It is to be understood that more than one kind of cationic monomer may be present in the Formula I.

At present, the preferred water soluble block copolymer for sludge dewatering applications is:

Formula II

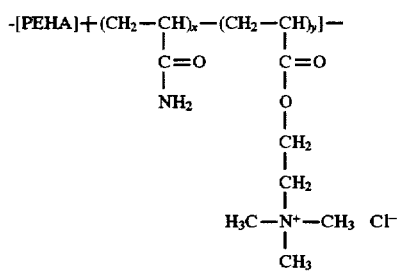

wherein PEHA is poly(2-ethylhexyl acrylate) obtained from polymerization of 2-ethylhexyl acrylate (EHA) initiated by a diperoxide initiator, 2,5-dihydroperoxy-2,5-dimethylhexane (Luperox 2,5-2,5, Pennwalt). The resulting poly(EHA) is water insoluble and has a hydrophobic nature. The number average molecular weight (Mn) of poly(EHA) may fall within the range of 500 to 1,000,000. Preferably, the number average molecular weight will be within the range of 1,000 to 500,000, with the range of about 5,000 to about 200,000 being even more desirable. The key criterion is that the resulting block copolymer be water soluble. Since the diperoxide initiator is used to initiate EHA, the resulting poly(EHA) still contains peroxide for further reaction. It is then copolymerized with monomers x and y to form a block copolymer.

In this invention, the preferred monomer x is acrylamide and monomer y is 2-acryloxyethyltrimethyl ammonium chloride (AETAC). The molar percentage of x:y is from about 0:100 to 95:5, with the molar percentage of from about 65:35 to 80:20 being preferred. The block copolymers are prepared by a water-in-oil emulsion technique. Such processes have been disclosed in U.S. Pat. Nos. 3,284,393, Reissue U.S. Pat. No. 28,474 and Reissue U.S. Pat. No. 28,576, herein incorporated by reference. The resulting copolymers may also be further isolated by precipitating it in an organic solvent such as acetone and dried to a powder form. The powder can be easily dissolved in an aqueous medium for use in desired application.

Branching agents such as polyethyleneglycol di(meth) acrylate, methylene bis(meth)acrylamide, N-vinyl acrylamide, allyl glycidyl ether, glycidyl acrylate and the like may also be added, providing the resulting block copolymer is water soluble. It is to be understood that the aforementioned polymerization methods do not in any way limit the synthesis of polymers according to this invention. Any of the well know chain transfer agents familiar to those who skilled in the art may be used to control the molecular weight. Those include, but are not limited to, lower alkyl alcohols such as isopropanol, amines, mercaptans, phosphites, thioacids, allyl alcohol and the like.

The structure of the block copolymer is substantiated by a conventional solution viscosity study and $C^{13}$ NMR spectroscopy. The molecular weight of the resulting block copolymer is not critical, as long as it is soluble in water.

The resulting block copolymer should be added to the deinking sludge to be dewatered in an amount sufficient for its intended purpose. For the most part, this amount will vary depending upon the particular system for which treatment is desired and can be influenced by such variables as pH, temperature, water quantity and types and levels of contaminants present in the sludge.

For purposes of the present invention, the term "an effective dewatering amount" is defined as that amount of block copolymer that will dewater the deinking sludge. Preferably, this amount will range from about 10 parts to about 1000 parts product per million parts of deinking sludge.

The block copolymer may be added directly to the deink sludge prior to primary dewatering. The copolymer may also be added after the deink sludge has been subjected to a thickener or the like. The block copolymer may also be added to the sludge prior to other dewatering processes such as belt presses, screw presses or centrifuges.

Compounds such as alum, and ferric chloride, anionic polymers, such as copolymers of acrylamide with acrylic acid, 2-acryl amido-2 methylpropylsulfonic acid or styrene sulfonate etc., and other cationic polymers for example, polydimethyidiallyl ammonium chloride (DMDAC); condensation product of epichlorohydrin with alkylamines; copolymers of acrylamide with DMDAC, methacryloyloxy-ethyltrimethyl ammonium methosulfate (METAMS), methacrylamidopropyltrimethyl ammonium chloride (MAPTAC), acrylamidopropyltrimethyl ammonium chloride (APTAC), acryloyloxyethyltrimethyl ammonium chloride (AETAC), methacryloyloxyethyltrimethyl ammonium chloride (METAC), acryloyloxyethyl diethylmethyl ammonium chloride or their methyl sulfate quats may be used in conjunction with the polymers in this invention for deink sludge dewatering.

The invention will now be described with reference to a number of specific examples which are to be regarded solely as illustrative of the method of the present invention and should not be construed as limiting the scope thereof.

EXAMPLES

The dewatering performances of various polymer treatments were evaluated using the BetzPaperChem Drainage Device (BPDD) as a sludge dewatering simulator. This device has the ability to accurately measure the volume of filtrate drained from a slurry versus time at rapid data acquisition rates. It can also apply vacuum at specified point(s) along the drainage curve. A gravity table wire was used as the thickening medium. The rotor was removed from the device prior to testing.

Deink plant sludge samples were procured from two mill sources. One process used office wastepaper to make deinked market pulp. The other process used old newspapers and magazines to produce deinked pulp for integrated paper manufacturing. These two sludge samples are characterized in Table I.

TABLE I

| Source | Newsprint Deinking | Office Waste Deinking |
|---|---|---|
| Consistency as received (%) | 1.3–2.1% | 1.3–2.2% |
| Filtrate Analysis | | |
| M-Alkalinity (ppm) | 669 | 595 |
| Chloride (ppm) | 207 | 50 |
| Total Phosphorous (ppm) | 0.54 | 0.54 |
| Sulfate (ppm) | 223 | 526 |
| Aluminum (ppm) | 0.59 | 0.87 |
| Barium (ppm) | 0.12 | 0.03 |
| Calcium (ppm) | 631 | 734 |
| Copper (ppm) | 0.06 | 0.03 |
| Iron (ppm) | 0.46 | 2.23 |
| Magnesium (ppm) | 30.9 | 34.4 |
| Manganese (ppm) | 0.49 | 0.49 |
| Sodium (ppm) | 348 | 294 |
| TOC (ppm) | 597 | 746 |
| Conductivity (microsiemens) | 2850 | 2750 |
| pH | 7.3 | 6.9 |
| Silicon Dioxide (ppm) | 33.3 | 15.5 |
| Solids Analysis | | |
| Ash % | 27.2 | 40.0 |
| Methylene Chloride Extractibles % | 6.0 | 1.8 |
| Calcium % of Inorganics | 12 | 24 |
| Iron % of Inorganics | 1 | 1 |
| Magnesium % of Inorganics | 2 | 1 |
| Silicon % of Inorganics | 44 | 33 |
| Carbonates % of Inorganics | 2 | 12 |
| Titanium % of Inorganics | 6 | 1 |
| Sodium % of Inorganics | 1 | 0 |
| Aluminum % of Inorganics | 31 | 23 |
| Sulfur % of Inorganics | 1 | 0 |
| Particle Size Analysis (in Microns)* | | |
| Mean size | 268 | 156 |
| Median size | 76 | 49 |
| Size cutoff < 10% sample volume | 7.0 | 7.6 |
| Size cutoff < 25% sample volume | 25 | 21 |
| Size cutoff < 50% sample volume | 76 | 49 |
| Size cutoff < 75% sample volume | 321 | 141 |

*Via Coulter LS 230 Particle Size Analyzer, volume weighted statistics

For each test run, a 250 mL sample of sludge was heated to the mill operating temperature. In initial work, it was tested without dilution. During the dose/response study described below, 50 mL of deionized wastewater was used to wash the walls of the sample cell prior to test initiation. Test initiation allowed the sludge to drain through the wire under the force of gravity. Drainage rate data were collected. At a specified total volume drained for a test series (125–175 mL without washwater, 175–225 mL with washwater), a constant vacuum was applied to increase the dewatering rate. This allowed formation of a pad, which could then be removed and measured for solids content.

The gravity drainage data were found to have the most significance in predicting the performance of various polymer treatments under production-scale conditions. Gravity dewatering data were recorded in terms of a gravity drainage time (GDT) and a gravity drainage rate (GDR). The GDT is the elapsed time between test initiation and the initiation of vacuum dewatering. A lower value is preferred. The vacuum initiation point was at a constant volume for each test series. The GDR is the mean of the volumes drained at 3, 6, 9 and 12 seconds after test initiation for a given condition. A higher value is preferred. The GDT has the potential to weight the influence of the latter part of the volume versus time curve more heavily. The GDR has the potential to weight the earlier, steeper part of the curve more heavily.

In addition to gravity dewatering, first pass retention (FPR) and water retention value (WRV) data are also presented. FPR is defined as the percent of initial dry solids retained in the sludge pad after dewatering is completed. The WRV is determined by taking the sludge pad and centrifuging it at 3750 rpm (900 g) for 30 minutes. This test evaluates treatments to affect the ultimate dewaterability of sludge. The WRV has units of: g water retained per g of OD solids.

Work was performed at two levels. An initial testing evaluated single doses of polymers against each other in the dewatering of each sludge source. The data refer to emulsion products of block, graft, linear and branched (cross-linked) molecular form being evaluated against each other at three different levels of cationicity; 20 mole %, 35–40 mole %, and 55–60 mole %. Polymers were applied at the "mid" dosage range dose as described in Table II. The "mid" range doses represent average commercial treatment values.

TABLE II

| | Emulsion Polymer Dosages | | |
|---|---|---|---|
| Charge Substitution | "Low" Dose (ppm Actives) (Mean +/− STD. Dev.) | "Mid" Dose (ppm Actives) (Mean +/− STD. Dev.) | "High" Dose (ppm active) (Mean +/− STD. Dev. |
| 20 Mole % | 10.5 +/− 0.5 | 21.0 +/− 0.9 | 31.5 +/− 1.4 |
| 35–40 Mole % | 9.4 +/− 0.6 | 18.9 +/− 1.1 | 28.4 +/− 1.6 |
| 55–60 Mole % | 9.1 +/− 1.1 | 18.2 +/− 2.2 | 27.3 +/− 3.3 |

Treatments which were identified as being in roughly the top fifty percent of the treatments being evaluated above were advanced to a more thorough dose/response study. Here, each polymer was evaluated at the "low", "mid", and "high" doses as described in Table II. The results of this testing are presented in Tables IV and VI for the initial screening and Tables V and VII for the advanced testing. Tables IV and V report results with office waste deinking sludge. Tables VI and VII report results with newsprint deinking sludge. Table III describes the polymers utilized in this testing.

TABLE III

| Treatment | Structure of Polymer |
|---|---|
| A | 20% cationicity block polymer as described in U.S. Pat. No. 5,182,331 |
| B | 20% cationicity graft copolymer as described in U.S. Pat. No. 5,298,566 |
| C | 20% cationicity linear copolymer available as EM240L from Floerger |
| D | 20% cationicity branched copolymer available as EM240BD from Floerger |
| E | 35% cationicity block polymer as described in U.S. Pat. No. 5,182,331 |
| F | 40% cationicity linear copolymer available as EM440 from Floerger |
| G | 40% cationicity linear copolymer available as EM440L from Floerger |
| H | 40% cationicity linear copolymer available as EM440LH from Floerger |
| I | 40% cationicity branched copolymer available as EM440BD from Floerger |
| J | 55% cationicity block polymer as described in U.S. Pat. No. 5,182,331 |
| K | 60% cationicity linear copolymer available as EM640L from Floerger |

The inventive copolymers were prepared according to the methods described above and in U.S. Pat. No. 5,182,331, the contents of which are wholly incorporated by reference therein.

TABLE IV

Office Waste Deinking Sludge Dewatering - Initial Screening

| Treatment | GDT[1] (Sec.) | FPR (%) | WRV(g H$_2$O/g solids) |
|---|---|---|---|
| A[2] | 10.54 | 99.85 | 1.27 |
| B | 23.92 | 98.74 | 1.24 |
| C | 12.65 | 99.50 | 1.27 |
| D | 34.02 | 97.35 | 1.27 |
| E[2] | 10.86 | 99.89 | 1.27 |
| F | 14.19 | 99.15 | 1.27 |
| G | 16.10 | 99.08 | 1.27 |
| H | 11.86 | 99.71 | 1.26 |
| I | 29.19 | 97.60 | 1.38 |
| J[2] | 12.62 | 99.73 | 1.29 |
| K | 10.55 | 99.52 | 1.26 |
| Control | 75.01 | 93.04 | 1.40 |

[1]GDT is time from test initiation required to reach 175 mL drained from a 250 mL sample
[2]Inventive block copolymer These data demonstrate that the gravity drain times achieved with the 20 mole % cationic and 35 mole % cationic block structures were significantly faster than those achieved with graft, linear, or branched (cross-linked) structures of like cationicity.

Products which appeared to provide superior gravity drainage times were advanced to a dose/response study as described above. Results are presented in Table V.

TABLE V

Office Waste Deinking Sludge Dewatering Average Values from Dose/Response Testing

| Treatment | Avg. GDT[1] (Sec.) | Avg. GDR (mL) | Avg. FPR (%) | Avg. WRV (g H$_2$O/g Solids) |
|---|---|---|---|---|
| A[2] | 15.75 | 185.95 | 99.4 | 1.29 |
| B | 19.97 | 154.64 | 99.4 | 1.29 |
| C | 22.48 | 160.43 | 99.0 | 1.29 |
| E[2] | 14.53 | 199.60 | 99.6 | 1.27 |
| F | 22.05 | 173.30 | 99.0 | 1.32 |
| G | 18.61 | 179.24 | 99.4 | 1.25 |
| J[2] | 18.09 | 184.50 | 99.1 | 1.31 |
| K | 19.16 | 188.09 | 99.4 | 1.26 |

[1]GDT is time from test initiation required to reach 225 mL drained from a 250 mL sample plus 50 mL DI washwater
[2]Inventive block copolymer This data demonstrates that block copolymers having 20 mole % and 35 mole % cationicity provide faster GDT'S and greater GDR's for office waste deinking sludge than linear or graft structures. The 55 mole % cationicity copolymer (J) was approximately equivalent to a 60 mole % cationicity linear structure.

Further screening studies were performed on newsprint sludge. Results are presented in Table VI.

TABLE VI

Newsprint Deinking Sludge Dewatering - Initial Screening

| Treatment | GDT[1] (Sec.) | FPR (%) | WRV (g H$_2$O/g Solids) |
|---|---|---|---|
| A[2] | 19.24 | 96.05 | 1.33 |
| B | 20.60 | 97.71 | 1.29 |
| C | 30.96 | 95.51 | 1.53 |
| D | 42.88 | 93.75 | 1.53 |
| E[2] | 25.55 | 95.90 | 1.33 |
| F | 33.99 | 93.74 | 1.52 |
| G | 41.51 | 95.00 | 1.50 |
| H | 36.26 | 96.85 | 1.47 |
| I | 38.63 | 91.94 | 1.57 |
| J[2] | 28.97 | 95.76 | 1.33 |
| K | 27.67 | 94.64 | 1.04 |
| Control | 39.67 | 92.74 | 1.43 |

[1]GDT is time from test initiation required to reach 125 mL drained from a 250 mL sample
[2]Inventive Block Copolymer This study demonstrates that 20 mole % and 35 mole % cationic block copolymers were more effective than the graft, linear of branched (cross-linked) structures of similar charge in producing quicker gravity drain times.

TABLE VII

Newsprint Deinking Sludge Dewatering Average Values from Dose/Response Testing

| Treatment | Avg. GDT[1] (Sec.) | Avg. GDR (mL) | Avg. FPR (%) | Avg. WRV (g H$_2$O/g Solids) |
|---|---|---|---|---|
| A[2] | 34.00 | 94.01 | 97.1 | 1.38 |
| B | 29.77 | 102.39 | 98.3 | 1.34 |
| C | 45.73 | 81.13 | 97.1 | 1.39 |

[1]GDT is time from test initiation required to reach 175 mL drained from a 250 mL sample plus 50 mL DI washwater
[2]Inventive block copolymer Table VII demonstrates that the 20 mole % graft structure provided better newsprint sludge dewatering performance than the inventive block copolymer. This result is contrary to the initial screening data presented in Table VI.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for dewatering deinking sludge selected from the group consisting of office waste deinking sludge and newsprint deinking sludge comprising adding to the sludge an effective dewatering amount of a water soluble block copolymer having the formula:

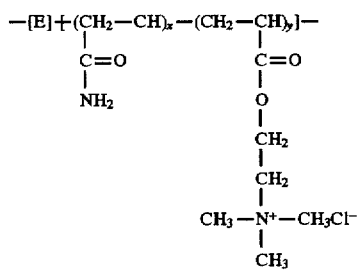

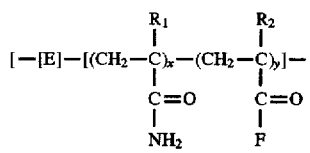

wherein E is a polymer of 2-ethylhexyl acrylate and the molar percentage of nonionic monomer X: cationic monomer Y, is from about 65:35 to 80:20 with the proviso that the total of X+Y equals 100%.

2. The method as claimed in claim 1 wherein the number average molecular weight of E is about 500 to 1,000,000.

3. The method as claimed in claim 1 wherein the number average molecular weight of E is about 1,000 to 500,000.

4. The method as claimed in claim 1 wherein the number average molecular weight of E is about 5,000 to 200,000.

5. The method as claimed in claim 1 wherein said nonionic monomer is selected from the group consisting of acrylamide and alkylacrylamide.

6. The method as claimed in claim 1 wherein said cationic monomer is selected from the group consisting of 2-acryloxyethyltrimethyl ammonium chloride, 3-methacrylamidopropyltrimethyl ammonium chloride, 2-methacryloylethyltrimethyl ammonium chloride and diallyl dimethyl ammonium chloride.

7. The method as claimed in claim 1 wherein said water soluble block copolymer is added to said sludge in an amount ranging from about 10 parts to about 1000 parts per million parts sludge.

8. The method as claimed in claim 1 further comprising dewatering sludge in a rotary screen thickener or gravity dewatering table.

9. The method as claimed in claim 1 further comprising dewatering sludge in a belt press, screw press or centrifuge.

* * * * *

UNITED STATES PATENT AND TRADEMARK OFFICE
CERTIFICATE OF CORRECTION

PATENT NO. : 5,800,719
DATED : September 1, 1998
INVENTOR(S) : Sutman, et al.

It is certified that error appears in the above-identified patent and that said Letters Patent is hereby corrected as shown below:

On the title page, item [54] and col. 1, lines 1-3, title should read--

Method for Dewatering Deinking Sludge Using a Water Soluble Block Copolymer   --.

Signed and Sealed this

Twenty-third Day of February, 1999

Attest:

Q. TODD DICKINSON

*Attesting Officer*      *Acting Commissioner of Patents and Trademarks*